(12) United States Patent
Meunier

(10) Patent No.: US 8,719,702 B2
(45) Date of Patent: May 6, 2014

(54) DOCUMENT ORGANIZING BASED ON PAGE NUMBERS

(75) Inventor: Jean-Luc Meunier, St. Nazaire les Eymes (FR)

(73) Assignee: Xerox Corporation, Norwalk, CT (US)

( * ) Notice: Subject to any disclaimer, the term of this patent is extended or adjusted under 35 U.S.C. 154(b) by 586 days.

(21) Appl. No.: 12/719,982

(22) Filed: Mar. 9, 2010

(65) Prior Publication Data

US 2011/0225490 A1 Sep. 15, 2011

(51) Int. Cl.
*G06F 17/27* (2006.01)

(52) U.S. Cl.
USPC .......... 715/251; 715/231; 715/232; 715/234; 715/236; 715/255

(58) Field of Classification Search
CPC .................................................. G06F 17/276
USPC .................. 715/231–234, 236, 255
See application file for complete search history.

(56) References Cited

U.S. PATENT DOCUMENTS

| | | | |
|---|---|---|---|
| 6,735,335 B1 * | 5/2004 | Liu et al. ........................ | 382/218 |
| 7,210,102 B1 * | 4/2007 | Gordon et al. ................ | 715/253 |
| 2004/0119998 A1 * | 6/2004 | Xiong ........................... | 358/1.13 |
| 2006/0248070 A1 | 11/2006 | Dejean et al. | |
| 2007/0196015 A1 | 8/2007 | Meunier et al. | |
| 2007/0198912 A1 | 8/2007 | Meunier | |
| 2008/0065671 A1 | 3/2008 | Dejean et al. | |
| 2008/0114757 A1 | 5/2008 | Dejean et al. | |
| 2009/0073501 A1 * | 3/2009 | Gutarin ......................... | 358/403 |
| 2009/0110268 A1 | 4/2009 | Dejean et al. | |
| 2009/0192956 A1 | 7/2009 | Dejean et al. | |

OTHER PUBLICATIONS

Belaid et al. "Part-of-Speech Tagging for Table of Contents Recognition," 15th International Conference on Pattern Recognition (ICPR'00)—vol. 4, pp. 451-454 (2000).
Dresevic et al., "Book Layout Analysis: TOC Structure Extraction Engine," Advances in Focused Retrieval: 7th International Workshop of the Initiative for the Evaluation of XML Retrieval, INEX 2008, Dagstuhl Castle, Germany, Dec. 15-18, 2008.
Lin et al., "Detection and Analysis of Table of Contents Based on Content Association," Springer-Verlag (2005).

* cited by examiner

*Primary Examiner* — Cesar Paula
*Assistant Examiner* — Mohammed-Ibrahim Zuberi
(74) *Attorney, Agent, or Firm* — Fay Sharpe LLP

(57) ABSTRACT

A digital processing device is configured to perform a method comprising: identifying logical page numbers of a document, the identifying constrained to identify either zero or one logical page number per page of the document, the logical page numbers and an ordering of the pages of the document defining an ordered sequence of logical page numbers; identifying a sequence of logical page number references in the document, each logical page number reference matching one of the logical page numbers of the document; and selecting a sub-sequence of the sequence of logical page number references for which corresponding logical page numbers are in a nondecreasing order in the ordered sequence of logical page numbers. The sub-sequence is used in organizing the document, for example by generating hyperlinks linking the logical page number references of the selected sub-sequence with corresponding pages indicated by the logical page numbers.

17 Claims, 3 Drawing Sheets

TABLE OF CONTENTS

I. DEDICATION ................................................................ ( i )

II. PREFACE .................................................................... ( iv )

III. CHAPTER 1: INTRODUCTION ........................................ 1

IV. CHAPTER 2: THEORETICAL FOUNDATIONS ................. 5
    BASIC THEORY... 5    PRACTICAL ISSUES ... 12
    PANEL: A BRIEF HISTORY OF DEVELOPMENT... P-1

V. CHAPTER 3: PRACTICAL APPLICATIONS ..................... 22
    ENVIRONMENTAL MANAGEMENT.... 23
    PANEL: A WETLANDS CASE STUDY.... P-2
    BUSINESS MANAGEMENT.... 33    GOVERNMENT.... 40
    PANEL: WEST LONDON CITY CASE STUDY.... P-3

VI. CHAPTER 4: EXTENSIONS ........................................... 52
    OTHER MATHEMATICAL MODELS... 53
    PANEL: MODEL A.... P-4    COMPUTER SIMULATIONS.... 58

*FIG. 3*

DOCUMENT ORGANIZING BASED ON PAGE NUMBERS

BACKGROUND

The following relates to the document processing arts, document archiving arts, document structuring arts, and related arts.

Some approaches for automated or semi-automated document structuring make use of in-document organizational tables, such as tables of content, or tables of figures, or so forth. The organizational tables provide semantic information, in the language of the document author or generator, that can be useful in the document structuring. The following published U.S. applications relate to detection of and/or automated or semi-automated document structuring based on organizational tables in the document: Dejean et al., U.S. Publ. No. 20060248070 A1 titled "Structuring Document based on Table of Contents"; Meunier et al., U.S. Publ. No. 2007/0196015 A1 titled "Table of Contents Extraction with Improved Robustness"; Meunier, U.S. Publ. No. 2007/0198912 A1 titled "Rapid Similarity Links Computation for Table of Contents Determination"; Dejean et al., U.S. Publ. No. 2008/0065671 A1 titled "Methods and Apparatuses for Detecting and Labeling Organizational Tables in a Document"; and Dejean et al., U.S. Publ. No. 2009/0110268 A1 titled "Table of Contents Extraction based on Textual Similarity and Formal Aspects"; each of which is incorporated herein by reference in its entirety.

Other approaches for automated or semi-automated document structuring utilize detection of sequences of identifiers in a document. For example, specifications for commercial building design and construction projects in North America sometimes employ standardized CSI numbers defined in the MasterFormat™ industry standard promulgated by the Construction Specifications Institute (http://www.masterformat.com/, last accessed Nov. 9, 2009). By detecting such standardized numbers, substantial semantic information about the document organization can be obtained. The following published U.S. application relates to detection of ordered sequences of identifiers: Dejean et al., U.S. Publ. No. 2009/0192956 A1 titled "Method and Apparatus for Structuring Documents Utilizing Recognition of an Ordered Sequence of Identifiers"; which is incorporated herein by reference in its entirety.

Yet other approaches for automated or semi-automated document structuring utilize detection of page numbers. These approaches are predicated on the assumption that the unstructured document has identifiable "page" units that are enumerated by page numbers. For example, a hardcopy document printed on physical sheets of paper that are enumerated by page numbers may be scanned using an optical scanner. Alternatively, the document may be generated electronically in a "print-ready" format that is paginated and includes page numbers. The following published U.S. application relates to detection of page numbers in a document: Dejean et al., U.S. Publ. No. 2008/0114757 A1 titled "Versatile Page Number Detector"; which is incorporated herein by reference in its entirety.

Existing approaches for automated or semi-automated document structuring based on contained organizational tables typically operate by identifying links between text entries in an organizational table and similar corresponding text in the referenced section. For example, text entries of a table of contents are often similar or identical to a textual heading disposed at the beginning of a corresponding chapter, section, or other corresponding document unit. As another example, a table of figures often contains a text entry similar to a first line of a textual caption located proximate to the referenced figure.

In paginated documents, organizational tables often reference page numbers. However, attempting to utilize the page numbers listed in an organizational table in structuring the document based on the organizational table is complicated by numerous factors. The document, or even the organizational table itself, may contain numbers that are not part of the organizational table page number referencing scheme. For example, a table of contents may list the chapter number (which is not a page number but rather consecutively enumerates the chapters) in addition to listing the page number at which the chapter starts. The pages themselves may also have diverse enumerations, such that the page numbers are not necessarily sequential. For example, the numbering may restart at "1" at each chapter or section of a document. A corollary of this is that the page numbers are not necessarily unique. In other variations, the document may have a preface section that is enumerated differently (for example, using Roman numerals whilst the remainder of the document is enumerated by Arabic numbers). Certain special pages may also employ a special enumeration scheme. For example, photographic plate pages may have different enumeration as compared with text pages of the document. Still further, the organizational table or tables may include different "levels" of page numbering—for example, some tables of contents include a page number for each chapter and additionally list page numbers for various sections or sub-sections within the chapter.

The following discloses methods and apparatuses for classifying documents without reference to page order.

BRIEF DESCRIPTION

In some illustrative embodiments disclosed as illustrative examples herein, a method comprises: (i) generating a mapping that maps a logical page number to one or more physical page numbers indicating one or more ordered pages of a document; (ii) identifying a sequence of logical page number references in the document sequenced in accordance with a reading order for the document; and (iii) selecting a sub-sequence of the sequence of logical page number references that maps to a nondecreasing sequence of physical page numbers, the selecting being biased toward selecting a long sub-sequence and being biased toward selecting a dense sub-sequence; wherein the operations (i), (ii), and (iii) are performed by a digital processor.

In some illustrative embodiments disclosed as illustrative examples herein, an apparatus comprises a digital processing device configured to perform a method comprising: identifying logical page numbers of a document, the identifying constrained to identify either zero or one logical page number per page of the document, the logical page numbers and an ordering of the pages of the document defining an ordered sequence of logical page numbers; identifying a sequence of logical page number references in the document, each logical page number reference matching one of the logical page numbers of the document; and selecting a sub-sequence of the sequence of logical page number references for which corresponding logical page numbers are in a nondecreasing order in the ordered sequence of logical page numbers.

In some illustrative embodiments disclosed as illustrative examples herein, a storage medium stores instructions executable on a digital processing device to perform a method operating on a document having a reading order and being paginated into an ordered sequence of pages, the method including identifying zero or one logical page number for each page of the document, identifying a sequence of logical page number references that reference the logical page numbers, and selecting a sub-sequence of sequence of the logical page number references corresponding to a nondecreasing sequence of pages of the document.

BRIEF DESCRIPTION OF THE DRAWINGS

FIG. 3 diagrammatically shows a table of contents as an illustrative example of an organizational table.

DETAILED DESCRIPTION

Figure 1:
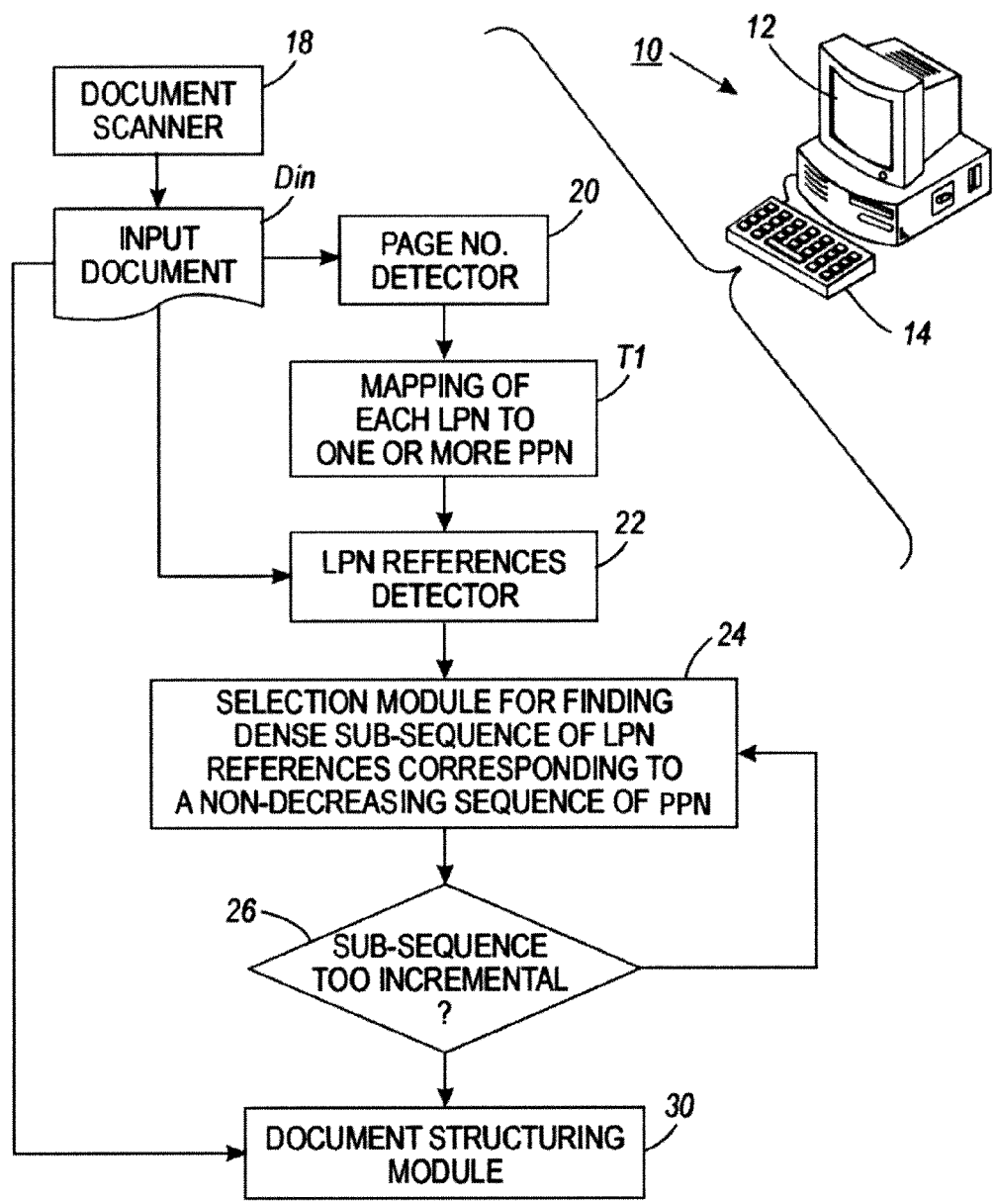
FIG. 1 diagrammatically shows a document organization system including identification of page numbers and corresponding lists of page number references.

With reference to FIG. 1, an illustrative apparatus for organizing a document including identification of page numbers and corresponding lists of page number references is embodied by a computer 10. The illustrative computer 10 includes user interfacing components, namely an illustrated display 12 and an illustrated keyboard 14. Other user interfacing components may be provided in addition or in the alternative, such as mouse, trackball, or other pointing device, a different output device such as a hardcopy printing device, or so forth. The computer 10 could alternatively be embodied by a network server or other digital processing device that includes a digital processor (not illustrated). The digital processor may be a single-core processor, a multi-core processor, a parallel arrangement of multiple cooperating processors, a graphical processing unit (GPU), a microcontroller, or so forth.

With continuing reference to FIG. 1, the computer 10 or other digital processing device is configured to perform a document organizational process applied to an input document. In the illustrative example, a document scanner 18 scans the physical pages of a hardcopy document printed on physical sheets of paper to generate an input document Din in electronic form that has tokenized textual content and is paginated. In some embodiments, for example, the document scanner 18 comprises hardware including an optical scanner for optically scanning each page to generate an electronic image of each page (for example, in JPEG, TIFF, PNG, image PDF, or another standard image format), and software scanner control software and further including an optical character recognition (OCR) software for decomposing the image into tokenized textual content. In other embodiments, the input document Din is generated entirely electronically, for example by a word processor or other application program that generates content formatted as a "print-ready" document that is tokenized and paginated. It is to be appreciated that the document scanner 18, or the word processing or other application, whereby the input document Din is generated is not necessarily part of the document organizing apparatus—for example, the document Din may have been generated elsewhere and/or a while ago (e.g., a legacy document) and received by the document organizing apparatus via a local area network (LAN), the Internet, read from an optical disk, or so forth.

The input document Din comprises a set of ordered pages. Most or all pages contain tokens of text, optionally grouped in to larger units such as lines, paragraphs, columns, or so forth. (It is, however, contemplated for some pages to be completely blank, and/or for some pages to include only non-textual content such as images). Each token typically corresponds to a word of text, although the tokens may correspond to other textual units such as numbers, equations, characters of Asian language text, or so forth. The location of each token on the page is typically quantified, for example by a bounding box designated by coordinates (x, y) of a selected corner, center, or other locational designation of the bounding box, and optionally further by a width and height or other size/aspect ratio dimensions of the bounding box. Typographic information such as font type, font style or emphasis (e.g., italic, boldface, et cetera) may also optionally be associated with the tokens. Such documents are generated, for example, by some existing document scanners that include optical scanner and OCR components, by word processors or other application programs that output a document in a page description language (PDL), or so forth. By way of illustrative example, one such document type is a PDF document that includes embedded text.

Figure 2:
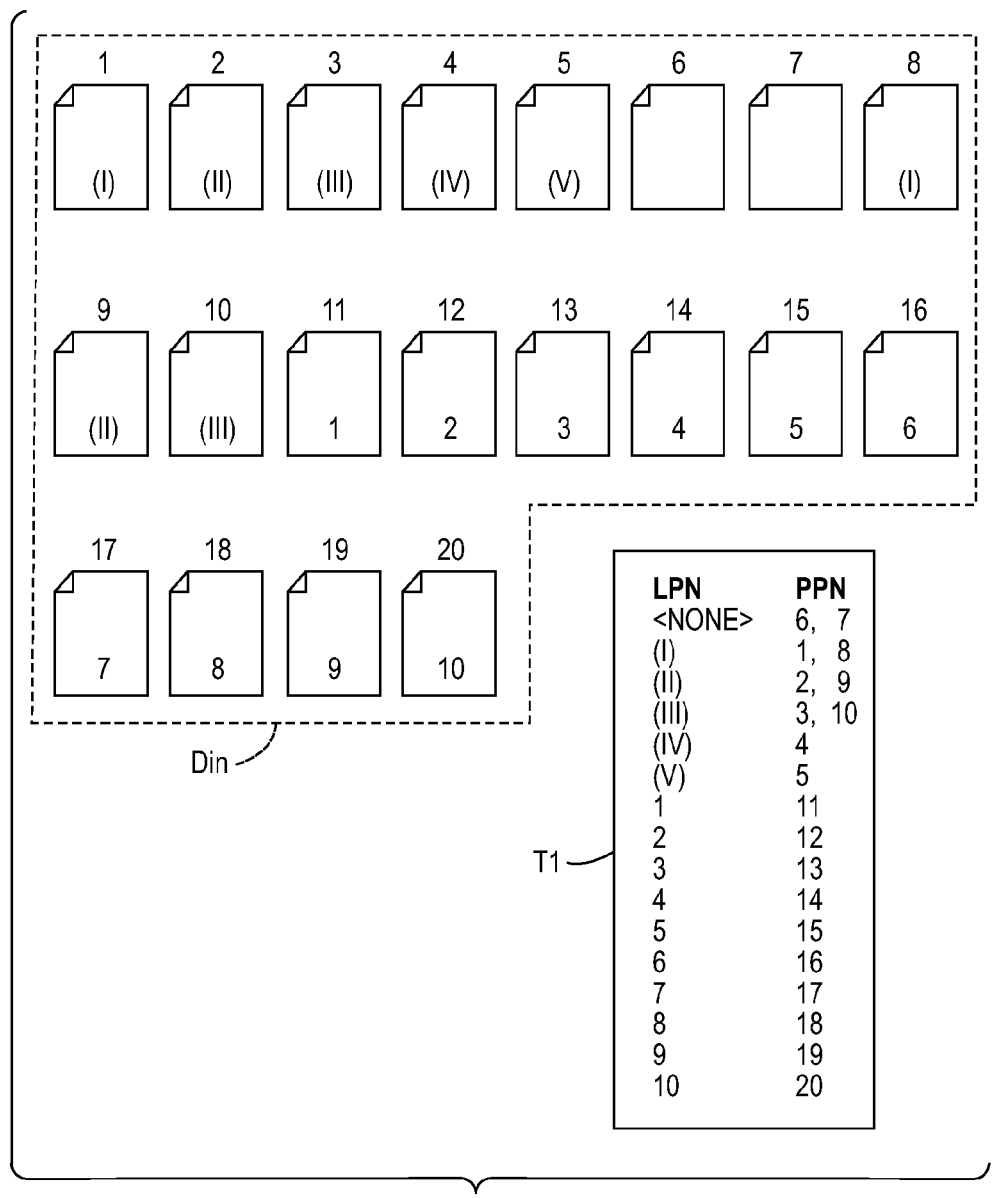
FIG. 2 diagrammatically shows pages of the input document diagrammatically indicated in FIG. 1. The pages of the input document are ordered so as to have physical page numbers (indicated above each page), and most of the pages are also marked with logical page numbers. In the diagrammatic view only the logical page number marking (if present) is shown on each page. The table at lower right shows the logical page numbers (LPN) of the pages of the document and for each LPN identifies the physical page number(s) (PPN) of page(s) numbered by that LPN.

With brief reference to FIG. 2, pages of an illustrative example of the input document Din are diagrammatically shown. The pages are ordered, and the page ordering defines a physical page numbering. The physical page number (PPN) of each page is diagrammatically shown in FIG. 2 by an Arabic number shown above the page. There are twenty pages and the PPN run consecutively from 1 to 20. Most (but not all) of the pages are also marked with a logical page number (LPN), as diagrammatically indicated by an enumeration located inside the diagrammatic page. In the diagrammatic view of FIG. 2 only the LPN marking (if present) is shown on each page—however, it is to be understood that most or all pages also include other text such as paragraphs of text or so forth, and some pages may additionally or alternatively include non-textual content such as images, graphs, or so forth. FIG. 2 also shows a table T1 at lower right, which tabulates all logical page numbers (LPN) that occur at least once in the document, and for each LPN identifies the physical page numbers (PPN) of all pages that include that LPN.

As will be noted, some LPN occur on more than one physical page, e.g. the LPN "(II)" occurs on both PPN 2 and PPN 9. As used herein, the term "degenerate" logical page number denotes a logical page number that occurs on two or more different pages of the document Din. Thus, in the illustrative example of FIG. 2, each of the LPN's "(I)", "(II)", and "(III)" are degenerate LPN. Furthermore, in the table T1 the designation "<none>" denotes a page having no logical page number—two physical pages (PPN 6 and 7) have no LPN.

The table T1 can also be thought of as a transform or mapping that maps an input LPN to one or more PPN. For example, inputting the LPN "(II)" into the transform T1 maps the LPN "(II)" to the unordered set [2, 9] of possible PPN. As another example, inputting the LPN "2" into the transform T1 maps to the unordered set [12] of possible PPN (in this instance there is only one PPN mapped to the LPN).

Yet another way of conceptualizing the informational content of the table T1 is as an ordered list or sequence of LPN. In the illustrative example of FIG. 2, the PPN 1 . . . 20 correspond to the following ordered LPN list or sequence: (I), (II), (III), (IV), (V), <none>, <none>, (I), (II), (III), 1, 2, 3, 4, 5, 6, 7, 8, 9, 10. As expected, in this sequence each degenerate LPN is listed more than once. In this case the PPN information is implicit in the ordering of the ordered LPN list or sequence, e.g. the third element of the ordered list is PPN 3.

With brief reference to FIG. 3 (which has no correlation with FIG. 2), an illustrative organizational table, specifically an illustrative table of contents, is shown which illustrates some other difficulties (besides LPN degeneracy) that can arise in identifying page number references in a document and associating the identified page number references with the corresponding document pages. For example, the table of contents of FIG. 3 lists chapter enumerations "Chapter 1", "Chapter 2", . . . which have the potential to be misinterpreted as page number references. The table of contents of FIG. 3 also indicates that the document includes at least three different page numbering schemes: (1) a page numbering scheme employing lower-case Roman numerals, used to enumerate pages of the dedication and preface; (2) a page numbering scheme employing Arabic numbers for most pages of the document; and (3) a page numbering scheme of the form "P-x" where "x" denotes an Arabic number, used to enumerate so-called "panel" pages that provide specific examples, historical perspective, or other "special" information.

With returning reference to FIG. 1, the input document Din is paginated with ordered pages. The ordering of the pages defines the PPN, e.g. the first page is PPN 1, the second page is PPN 2, and so forth. Regarding the logical page numbers (LPN), the document structuring disclosed herein employs a page number detector 20 to detect LPN in the document Din so as to generate the table T1. Conceptualized another way, the page number detector 20 generates the transform or mapping T1 that maps a LPN to one or more PPN indicating one or more ordered pages of the document Din. Conceptualized yet another way, the page number detector 20 identifies the LPN which together with the ordering of the pages of the document Din defines an ordered LPN sequence or list T1, such as the ordered LPN sequence or list: "(I), (II), (III), (IV), (V), <none>, <none>, (I), (II), (III), 1, 2, 3, 4, 5, 6, 7, 8, 9, 10", in the illustrative example of FIG. 2.

The page number detector 20 can operate in various ways. In some embodiments, the marginal page number location is known a priori. In such cases, the LPN of a page is readily identified as the token or tokens located at the marginal page number location. Comparison of these token(s) with an enumeration pattern (for example, represented as a regular expression) enables the LPN enumeration to be determined. The enumeration pattern may also be known a priori, or alternatively may be extracted from the identified token(s).

If the marginal page number location is not known a priori, in may in some instances nonetheless be determined by analysis of the page layout of the pages of the document Din. For example, such an analysis can make use of the following generalized information: (1) the page numbers are usually located at a common marginal location on every page (except perhaps for a few pages that do not have page numbers); (2) the aforementioned common marginal location is usually a top or bottom marginal location, either in the center, left, or right; (3) in some documents (e.g., documents formatted for book binding) the marginal location may alternate left-right-left-right- . . . for successive pages); and (4) the tokens corresponding to page numbers typically conform with one or more predefined numbering patterns, for example "-#-", or "#", or "page #", or so forth, where the symbol (#) denotes an incremental element such as an Arabic number, a Roman numeral, an alphabetic number, or so forth.

In some embodiments, the page number detector 20 employs a page number detection technique set forth in Dejean et al., U.S. Pub. No. 2008/0114757 A1 entitled "Versatile Page Number Detector", which is incorporated herein by reference in its entirety. U.S. Pub. No. 2008/0114757 A1 discloses a method to detect page numbers in a document which does not rely on layout or visual information of the page numbers on the page. Instead, the approach of U.S. Pub. No. 2008/0114757 A1 finds a set of possible candidate sequences on the whole document and selects the most likely one.

With continuing reference to FIG. 1, the LPN are determined by the page number detector 20, and the ordered LPN sequence or list T1 (or, equivalently, an LPN-PPN mapping, tabulation, or so forth) is readily generated based on the detected LPN and the known ordering of the pages in the document Din. A logical page number (LPN) references detector 22 is then invoked to identify LPN references in the input document Din. Since the LPN are known the LPN references detector 22 can, in some embodiments, operate on a matching approach in which any token in the document Din that matches one of the LPN is accepted as an LPN reference. Preferably (although not necessarily) the tokens corresponding to the LPN are omitted from consideration as LPN references. This can be done, for example, by excluding the marginal regions of each page from the analysis performed by the LPN references detector 22, assuming that the page numbers are in a margin of each page.

The matching performed by the LPN references detector 22 is preferably more elaborate (i.e., relaxed) than a strict exact matching, in order to accommodate differences in notation that may be used in the LPN versus the LPN references. For example, the LPN may follow a pattern such as "-#-" whereas the LPN references may follow a pattern such as "page #". In some tables of contents or other organizational tables, a pattern such as "<label> . . . #" may be used for the LPN references, where <label> denotes a left-justified string of text identifying a chapter, section, or other indexed document part, the incremental element (#) indicating the page number is right-justified, and " . . . " denotes an extended ellipsis linking the left-justified label and the right-justified incremental part. Relaxed pattern matching is suitably performed, for example using a set of regular expressions embodying a range of possible LPN reference notations.

As another example of accommodating such formatting variations, in some embodiments the LPN references detector 22 selects as LPN references all tokens that exactly match one of the LPN, and additionally those tokens which start or end with an LPN, provided the LPN is separated from the rest of the string by a non-alphanumerical character. By way of example: "V." would match the LPN "V"; "page-4" or "page 4" would match the LPN "4"; "II." would match LPN "(II)"; and so forth. Other LPN reference selection techniques are also contemplated. For example, in some contemplated embodiments a prefix tree is used advantageously for a fast computation.

The LPN references detector 22 is designed to be overinclusive in that some (perhaps many) of the identified LPN references are not actually references to pages. Said another way, the LPN references detector 22 is configured to favor recall over precision. Moreover, where the LPN reference corresponds to a degenerate LPN, the referenced page is ambiguous. For example, with reference again to illustrative FIG. 2, an LPN reference "Page (II)" might reference either PPN 2 or PPN 9.

The LPN references identified by the LPN references detector 22 form a sequence or list of LPN references following a reading order of the document Din. The reading order is the order in which a reader would read the document Din. Typically, in a single-column document the reading order is left-to-right for each line of text (assuming a natural language such as English or French that is read from left to right), top-to-bottom on each page, and in increasing order of PPN starting at the first page (i.e., the page with lowest PPN). In a two-column format, the reading order for each page is usually modified in that the left-hand column is read line-by-line from top-to-bottom first, followed by reading the right-hand column line-by-line from top-to-bottom. Variations in these typical reading order configurations are contemplated, however, for example to accommodate natural languages that employ a right-to-left reading order, or in documents including large images or other blocks that may alter the reading order.

To provide more compact notation, the list of logical page numbers (LPN) generated by the page number detector 20 (and further making use of the known page ordering of the document Din) is denoted herein as the ordered sequence or list $\lambda_{LPN}$. For the illustrative document of FIG. 2, the ordered LPN list $\lambda_{LPN}$="(I), (II), (III), (IV), (V), <none>, <none>, (I), (II), (III), 1, 2, 3, 4, 5, 6, 7, 8, 9, 10". The list $\lambda_{LPN}$ contains all LPN that occur in the document Din in the page order in which they occur. Any degenerate LPN will occur multiple times in the ordered list $\lambda_{LPN}$, once for each page occurrence. In the ordered list $\lambda_{LPN}$, the PPN corresponding to any element (that is, any particular LPN instance) of the $\lambda_{LPN}$ is equal to the position of that LPN in the ordered list. Thus, for example, the first occurrence of the LPN "(III)" is as the third element of $\lambda_{LPN}$, and hence that LPN occurrence corresponds with PPN 3. The LPN "(III)" is degenerate in that it also occurs as the tenth item in the ordered list $\lambda_{LPN}$, and hence that second instance of the LPN "(III)" corresponds to PPN 10. The list $\lambda_{LPN}$ is a suitable representation of the output T1 of the page number detector 20. Note that the inclusion of the notation "<none>" or some other representation of pages that have no LPN maintains this positional correspondence for documents having some unnumbered pages.

In similar fashion, the output of the LPN detector 22 is suitably represented as a sequence or list $\lambda_{LPN\_ref}$ of LPN references ordered in accordance of their occurrence in the reading order of the document Din. Each LPN reference has an unambiguous one-to-one correspondence with a single LPN. The ordered sequence of LPN references is denoted herein as $\lambda_{LPN\_ref}$.

However, there are two difficulties. First, not every LPN reference in the ordered list $\lambda_{LPN\_ref}$ is actually a reference to a page of the document Din, because the LPN references detector 22 is overinclusive and is configured to favor recall over precision. Second, if the LPN reference is a reference to a degenerate LPN, then there is ambiguity as to which page (that is, which PPN) the LPN reference actually references (assuming that it is indeed a page reference at all). By way of the example of the illustrative document of FIG. 2, an LPN reference "page (II)" unambiguously references the LPN "(II)"—however, the LPN "(II)" is degenerate and is used to number both PPN 2 and PPN 9, so the LPN reference "page (II)" is ambiguous as to whether it is a reference to PPN 2 or PPN 9.

One way to accommodate LPN degeneracy in the notation is to consider each element of the ordered sequence or list $\lambda_{LPN\_ref}$ to be an unordered set of one or more PPN that correspond to the LPN, as indicated, for example, by the LPN-PPN transform, ordered LPN list, table (see, e.g., FIG. 2), or other representation of the output T1 of the page number detector 20. Considering the document of FIG. 2 by way of illustrative example, if $\lambda_{LPN\_ref}$ is the ordered list of LPN references "(I), (II), (III), 1, 2" then to incorporate LPN degeneracy this list can be written as an ordered list of unordered PPN sets: "[1, 8], [2, 9], [3, 10], [11], [12]" where the notation "[ . . . ]" denotes an unordered set of PPN.

To summarize, the ordered list $\lambda_{LPN\_ref}$ is overinclusive in that it may include elements that do not actually reference any page of the document, and additionally elements of the ordered list $\lambda_{LPN\_ref}$ which correspond to degenerate LPN are ambiguous as to which page they reference.

With continuing reference to FIG. 1, a sub-sequence selection module 24 selects a sub-sequence of the sequence $\lambda_{LPN\_ref}$ of LPN references that maps to a nondecreasing sequence of PPN. The selecting is biased toward selecting a long sub-sequence, and is also biased toward selecting a dense sub-sequence. Said another way, the selecting performed by the selection module 24 selects a sub-sequence of the sequence $\lambda_{LPN\_ref}$ of LPN references for which corresponding LPN's are in a nondecreasing order in the ordered sequence $\lambda_{LPN}$ of LPN generated by the page number detector 20 (that is, generated in conjunction with the known page ordering of the document Din). Again, the selecting is preferably biased toward long and dense sub-sequences. Said yet another way, the selecting performed by the selection module 24 selects a sub-sequence of sequence $\lambda_{LPN\_ref}$ of the LPN references corresponding to a nondecreasing sequence of pages of the document Din. Yet again, the selecting is preferably biased toward long and dense sub-sequences.

The selection of a sub-sequence of the sequence $\lambda_{LPN\_ref}$ of LPN references that maps to a nondecreasing sequence of PPN (or, for which corresponding LPN's are in a nondecreasing order in the ordered sequence $\lambda_{LPN}$ of LPN; or, which corresponds to a nondecreasing sequence of pages of the document Din) reflects the expectation that the entries of the table of contents or other organizational table will be in page order (although not generally consecutive page order). The mapped sequence of PPN is nondecreasing (as opposed to strictly increasing) in that it is possible for two successive document parts to reside on a same page so that the page numbers listed for two successive organizational table entries do not increment. For example, "Chapter 1" may start on PPN 3, and the sub-part titled "Part A" may also start on PPN 3—in this case, the organizational table entries for "Chapter 1" and "Part A" will both list the same LPN corresponding to PPN 3.

The biasing of the selecting toward selecting a long sub-sequence is based on the recognition that a document may include some (perhaps even many) short sequences of tokens (e.g., one, or two, or three, tokens) identified as LPN references by the LPN references detector 22 which however do not actually reference a page of the document Din, but which can be mapped to PPN forming a short nondecreasing sequence. Biasing toward selection of a longer sub-sequence tends to avoid selection of these erroneous short sequences.

The biasing of the selecting toward a dense sub-sequence is based on the expectation that a table of contents or other organizational table, or other list of page number references, is likely to occur over a relatively small fraction of the total length of the document Din. Thus, the selecting is biased toward a dense sub-sequence, for example by limiting the selecting to selecting a sub-sequence of the sequence of LPN references that spans no more than a predefined fraction or number of pages of the document Din. By way of quantitative example, in some embodiments it may be expected that the table of contents will not extend over more than five pages of the document. The size of the table of contents or other organizational table may in general be expected to increase with increasing document size (e.g., an eight-page table of contents is unexpected in a twenty-page paper, but might be expected in a three-hundred page book). Accordingly, in some contemplated embodiments the density bias is enforced not by a limit on the absolute number of pages containing the sequence of LPN references, but rather by limiting the selecting to sub-sequences that span no more than a predefined fraction of the total number of pages of the document Din. In yet other embodiments, the density bias may be enforced using a density constraint, for example by requiring that the average distance within the document between LPN references of the sub-sequence be no larger than a specified maximum average distance. It is also contemplated to employ various combinations of these density enforcement mechanisms.

Various algorithms can be employed by the sub-sequence selection module 24 to select a sub-sequence of the sequence $\lambda_{LPN\_ref}$ of LPN references that meet the foregoing criteria and biases. In some embodiments, candidate sub-sequences are identified which satisfy the sequencing constraint imposed by the PPN ordering of the document Din (or, equivalently, imposed by the ordering of the LPN sequence $\lambda_{LPN}$), and these candidate sub-sequences are quantitatively ranked or scored using a figure of merit that biases toward selecting a long sub-sequence and biases toward selecting a dense sub-sequence, the ranking or scoring then being used to optimize the selection of the sub-sequence and define the nondecreasing sequence of PPN.

In some embodiments, the sub-sequence selection module 24 employs a sub-sequence selection technique set forth in Dejean et al., U.S. Pub. No. 2009/0192956 A1 entitled "Method and Apparatus for Structuring Documents Utilizing Recognition of an Ordered Sequence of Identifiers", which is incorporated herein by reference in its entirety. U.S. Pub. No. 2009/0192956 A1 discloses a method to recognize identifiers (e.g., CSI numbers illustrative examples set forth in U.S. Pub. No. 2009/0192956 A1) in documents and to identify the related part of the document. Techniques set forth in U.S. Pub. No. 2009/0192956 A1 employ regular-expressions to recognize all possible identifiers (this operation is performed in the system of FIG. 1 by the LPN references detector 22) and uses a dynamic programming technique to select the longest sub-sequence of identifiers following a non-strict monotonic increase (that is, nondecreasing) order. In some illustrative embodiments disclosed in U.S. Pub. No. 2009/0192956 A1, a binary classifier is trained on the positive and negative identifiers found during the dynamic programming step. This classifier takes into account the position, typography, and similar parameters to improve the quality of the result.

The sub-sequence selection techniques set forth in Dejean et al., U.S. Pub. No. 2009/0192956 A1 find the longest sequence satisfying an ordering constraint, and hence include biasing toward selecting a long sub-sequence. In some suitable embodiments of the sub-sequence selection module 24, the sub-sequence selection technique as set forth in Dejean et al., U.S. Pub. No. 2009/0192956 A1 is modified to utilize the ordering constraint imposed by the page ordering of the document Din (for example, as represented by the LPN sequence $\lambda_{LPN}$), and is optionally further modified to include biasing toward selection of a dense sub-sequence. This latter modification can be made by incorporating a reward function, i.e., figure of merit optimization. A suitable figure of merit or reward function penalizes a page jump between two occurrences of a page number so as to favor dense sequences. In some suitable embodiments, a penalty that is linear with the number of pages jumped over between two successive items in the sub-sequence is used, e.g. three times the page gap.

As already noted, biasing toward selection of a dense sub-sequence can additionally or alternatively be implemented by limiting the selecting to selecting a sub-sequence of the sequence of LPN references that spans no more than a predefined fraction or number of pages of the document Din. One way to implement this approach is to construct the sub-sequence selection module 24 to employ a running window over the sequence $\lambda_{LPN\_ref}$ of LPN references, for example in which the size of the running window conforms with the predefined fraction or number of pages of the document Din.

In some embodiments, the output of the sub-sequence selection module 24 is taken as the final sub-sequence of the sequence $\lambda_{LPN\_ref}$ of LPN references that maps to a nondecreasing sequence of physical page numbers. However, a further filtering operation has been found to be useful, in which the selecting is filtered to exclude any sub-sequence that maps to a nondecreasing sequence of physical page numbers whose fraction of incremental physical page number steps is greater than F where F is greater than or equal to a threshold such as 0.5 or 0.7. In the embodiment of FIG. 1, a decision operation 26 performs this filtering which assesses whether the sub-sequence is "too incremental".

The rationale for including the filtering operation 26 is that the table of contents or other organizational table is generally expected to reference document parts or elements that are distributed throughout the document Din. On the other hand, some other numbering sequences in a document are likely to be sequential. For example, in a table of contents if the chapter numbers are listed these will likely be sequential (e.g., "Chapter 1", "Chapter 2", "Chapter 3", . . . ). If the sub-sequence maps to a nondecreasing sequence of PPN whose fraction of incremental physical page number steps is too high, this may suggest the LPN references are not actually references to page numbers, but rather are references to something else such as an enumeration of chapters, paragraphs, or other document parts or units. By way of another example, in the table of contents of FIG. 3 a sub-sequence consisting of Arabic numbers of the pattern "Chapter #" maps to a nondecreasing sequence of PPN which is incremental in nature. This incorrect identification of the chapter numbers as page numbers is recognized and removed by the filtering performed by the decision operation 26.

In a suitable approach for implementing the decision operation 26, a subsequence is discarded if it is of incremental nature as assessed by the decision operation 26 (for example, if 75% or more of the steps between two consecutive PPN of the sub-sequence equals one). In one suitable approach, the discarding of the sub-sequence can be implemented by discarding the PPN chosen for the sub-sequence from the PPN sets of the sequence $\lambda_{LPN\_ref}$ of logical page number references. (Recall that, for example, the ordered list $\lambda_{LPN\_ref}$ of LPN references "(I), (II), (III), 1, 2" conforming with the document of FIG. 2 can be represented as an ordered list of unordered PPN sets: "[1, 8], [2, 9], [3, 10], [11], [12]" where the notation "[ . . . ]" denotes an unordered set of PPN). If a PPN set becomes empty due to such removal, the corresponding LPN reference is then removed from the ordered list $\lambda_{LPN\_ref}$ of LPN references. After discarding the sub-sequence and modifying the list $\lambda_{LPN\_ref}$ of LPN references accordingly, processing returns to the sub-sequence selection module 24 as shown in FIG. 1 to generate a new optimized sub-sequence. This selection and filtering processing can be repeated iteratively to obtain the optimized sub-sequence.

By way of illustrative example, assume the LPN sequence of the document Din of FIG. 2, that is, the ordered list $\lambda_{LPN}$="(I), (II), (III), (IV), (V), <none>, <none>, (I), (II), (III), 1, 2, 3, 4, 5, 6, 7, 8, 9, 10". In this example, the degenerate LPN reference "(II)" can lead to either PPN 2 or PPN 9. So an LPN reference "(II)" is suitably represented in the list $\lambda_{LPN\_ref}$ of LPN references by the unordered PPN set [2, 9]. If the LPN references detector 22 generates a sequence $\lambda_{LPN\_ref}$ of LPN references of "(II), (III), (II), 3", this corresponds in PPN set notation to "[2, 9], [3, 10], [2, 9], [13]". The best sub-sequence of LPN references in this case will be "(II), (III), (II), 3" in which the LPN references are respectively associated to PPN 2, PPN 3, PPN 9, and PPN 13.

With continuing reference to FIG. 1, the output of the sub-sequence selection module 24 and optional filtering decision operation 26 is the selected sub-sequence of the sequence $\lambda_{LPN\_ref}$ of LPN references. This output is a "sub"-sequence insofar as it generally does not include all LPN references of the sequence $\lambda_{LPN\_ref}$ of LPN references. However, the discarded LPN references that are not included in the selected sub-sequence are expected to be erroneous references, that is, references that do not actually reference a page number. Accordingly, the selected sub-sequence output by the sub-sequence selection module 24 and optional filtering decision operation 26 is expected to be a sequence of real LPN references referencing PPN, with any LPN degeneracy issues resolved by the mapping to the mapped nondecreasing sequence of PPN. This sequence of real LPN references is suitably used by a document structuring module 30 to structure the input document Din.

In some embodiments, the structuring entails associating the LPN references of the selected sub-sequence with the corresponding PPN of the mapped nondecreasing sequence of PPN. The associating may, for example, be implemented by generating hyperlinks linking the LPN references of the selected sub-sequence in the document Din with ordered pages of the document Din indicated by the PPN's of the mapped nondecreasing sequence of PPN. With such hyperlinks, for example, a user reading the table of contents and wanting to go to the chapter indicated by a particular table entry simply clicks on the entry (which is a hyperlink) using a mouse or other pointing device-type input, and the hyperlink causes the document reader to move to the linked chapter. In other embodiments, the document structuring module 30 may structure the document as an XML document, and the sequence of real LPN references is used in generating the XML type definition (DTD).

Another variation, not illustrated herein, is to use the output sub-sequence (which, again, is expected to be a sequence of real LPN references) to train a statistical model for use in future LPN sub-sequence selection. The output sub-sequence serves as the training set, and is produced automatically as disclosed herein in an unsupervised manner. Accordingly, a supervised method is used internally but the overall approach is unsupervised. Such training can be used, for example, to correct OCR errors.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method operating on a document comprising an ordered sequence of pages, each page having a physical page number indicating its location in the ordered sequence of pages, the method comprising:
   (0) identifying logical page numbers comprising tokens in pages of the document based on at least one of commonality of a single marginal location of the identified logical page numbers in the pages of the document and conformance of the identified logical page numbers with one or more predefined numbering patterns;
   (i) generating a mapping that maps each identified logical page number to one or more physical page numbers indicating pages of the document marked by the logical page number;
   (ii) identifying a sequence of logical page number references comprising tokens in the document sequenced in the document in accordance with a reading order for the document;
   (iii) selecting a sub-sequence of the sequence of logical page number references that maps to a nondecreasing sequence of physical page numbers according to the mapping, the selecting being biased toward selecting a long sub-sequence and being biased toward selecting a dense sub-sequence; and
   (iv) structuring the document based on the selected sub-sequence of the sequence of logical page number references, the structuring including associating the logical page number references of the selected sub-sequence with the corresponding physical page numbers of the mapped nondecreasing sequence of physical page numbers;
   wherein the operations (0), (i), (ii), (iii), and (iv) are performed by a digital processor.

2. The method as set forth in claim 1, wherein the selecting comprises:
   biasing the selecting toward a dense sub-sequence by limiting the selecting to selecting a sub-sequence of the sequence of logical page number references that spans no more than a predefined fraction or number of pages of the document.

3. The method as set forth in claim 1, wherein the selecting further comprises:
   filtering the selecting to exclude any sub-sequence that maps to a nondecreasing sequence of physical page numbers whose fraction of incremental physical page number steps is greater than F where F is greater than or equal to 0.5.

4. The method as set forth in claim 1, wherein the selecting further comprises:
   filtering the selecting to exclude any sub-sequence that maps to a nondecreasing sequence of physical page numbers whose fraction of incremental physical page number steps is greater than F where F is greater than or equal to 0.7.

5. The method as set forth in claim 1, wherein the selecting comprises:
   generating a sequence of physical page number sets corresponding to the sequence of logical page number references by mapping each logical page number reference to a mapped set of one or more physical page numbers; and
   optimizing selections of single physical page numbers from the physical page number sets respective to a figure of merit that biases toward selecting a long sub-sequence and biases toward selecting a dense sub-sequence, the optimized selections defining the nondecreasing sequence of physical page numbers.

6. The method as set forth in claim 1, wherein the identifying a sequence of logical page number references in the document comprises:
   identifying the logical page number references as tokens in the document that match with the identified logical page numbers.

7. The method as set forth in claim 1, wherein the associating of the logical page number references with the corresponding physical page numbers comprises:
   generating hyperlinks linking the logical page number references of the selected sub-sequence with ordered pages of the document indicated by the physical page numbers of the mapped nondecreasing sequence of physical page numbers.

8. An apparatus comprising:
a digital processing device configured to perform a method operating on a document comprising an ordered sequence of pages, each page having a physical page number indicating its location in the ordered sequence of pages, the method comprising:
identifying logical page numbers comprising tokens in pages of the document based on at least one of commonality of a single marginal location of the identified logical page numbers in the pages of the document and conformance of the identified logical page numbers with one or more predefined numbering patterns;
generating a mapping that maps each identified logical page number to one or more physical page numbers indicating pages of the document marked by the logical page number;
identifying a sequence of logical page number references comprising tokens in the document sequenced in the document in accordance with a reading order for the document;
selecting a sub-sequence of the sequence of logical page number references that maps to a nondecreasing sequence of physical page numbers according to the mapping, the selecting being biased toward selecting a long sub-sequence and being biased toward selecting a dense sub-sequence; and
associating the logical page number references of the selected sub-sequence with the corresponding physical page numbers of the mapped nondecreasinq sequence of physical page numbers.

9. The apparatus as set forth in claim 8, wherein the selecting comprises:
biasing the selecting toward selecting a dense sub-sequence respective to distribution of the logical page number references in the document by limiting the selecting to selecting at least one of:
(i) a sub-sequence of the sequence of logical page number references that spans no more than a predefined fraction of pages of the document,
(ii) a sub-sequence of the sequence of logical page number references that spans no more than a predefined number of pages of the document, and
(iii) a sub-sequence of the sequence of logical page number references for which the average distance within the document between logical page number references of the sub-sequence is no larger than a maximum average distance.

10. The apparatus as set forth in claim 8, wherein the selecting comprises:
biasing the selecting toward selecting a long sub-sequence by selecting the longest sub-sequence of the sequence of logical page number references that maps to a nondecreasing sequence of physical page numbers according to the mapping while also satisfying a sequence density criterion.

11. The apparatus as set forth in claim 8, wherein the selecting comprises:
identifying a logical page number reference for which the corresponding logical page number is degenerate and occurs on two or more different pages, and
resolving the degeneracy to associate the logical page number reference with a single page of the document.

12. The apparatus as set forth in claim 11, wherein the resolving comprises:
selecting one of the two or more different pages on which the degenerate logical page number occurs in order to optimize a figure of merit biasing toward selecting a long sub-sequence and biasing toward selecting a dense sub-sequence respective to distribution of the logical page number references in the document.

13. The apparatus as set forth in claim 8, wherein the identifying logical page numbers of the document comprises:
identifying logical page numbers in the document based on both:
commonality of a single marginal location of the identified logical page numbers in the pages of the document, and
conformance of the identified page numbers with one or more predefined numbering patterns.

14. A non-transitory storage medium storing instructions executable on a digital processing device to perform a method operating on a document having a reading order and being paginated into an ordered sequence of pages with each page having a physical page number indicating its location in the ordered sequence of pages, the method including:
identifying logical page numbers comprising tokens in pages of the document based on at least one of commonality of a single marginal location of the identified logical page numbers in the pages of the document and conformance of the identified logical page numbers with one or more predefined numbering patterns;
generating a mapping that maps each identified logical page number to one or more physical page numbers indicating pages of the document marked by the logical page number;
identifying a sequence of logical page number references comprising tokens in the document sequenced in the document in accordance with a reading order for the document;
selecting a sub-sequence of the sequence of logical page number references that maps to a nondecreasing sequence of physical page numbers according to the mapping, the selecting being biased toward selecting a long sub-sequence and being biased toward selecting a dense sub-sequence; and
associating the logical page number references of the selected sub-sequence with the corresponding physical page numbers of the mapped nondecreasing sequence of physical page numbers.

15. The non-transitory storage medium as set forth in claim 14, wherein the identifying comprises identifying zero or one logical page number for each page of the document.

16. The non-transitory storage medium as set forth in claim 14, wherein the selecting a sub-sequence of the sequence of the logical page number references includes resolving one or more references to one or more degenerate logical page numbers in the sequence of logical page number references.

17. The method as set forth in claim 1, wherein the identifying operation (ii) omits from consideration as logical page number references those tokens comprising the logical page numbers.

* * * * *